April 17, 1962 E. WIESNER 3,030,535
DRIVE MOTOR FOR APPARATUS FOR REPRODUCING
SOUND RECORDS FROM SOUND CARRIERS
Filed Jan. 6, 1958 2 Sheets-Sheet 2
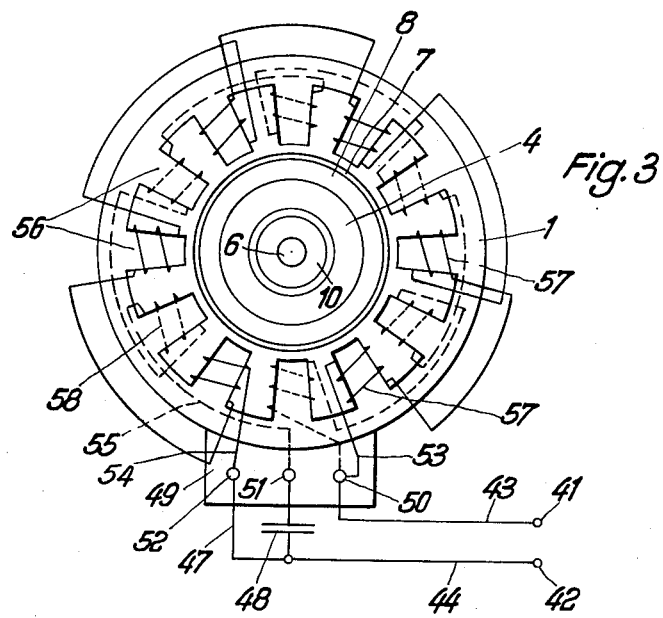
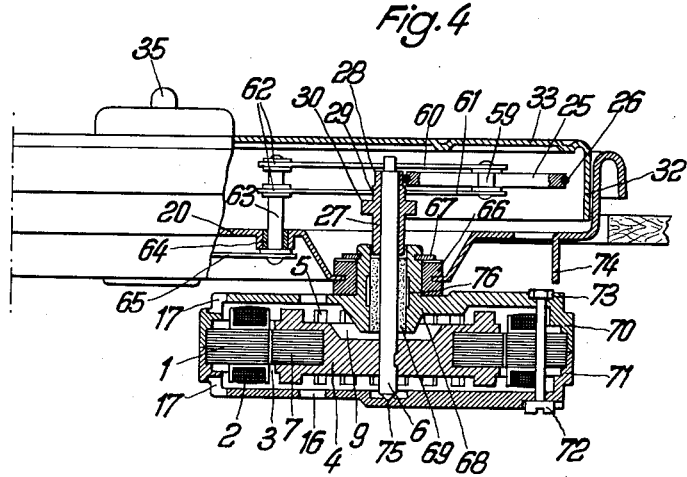
Inventor:

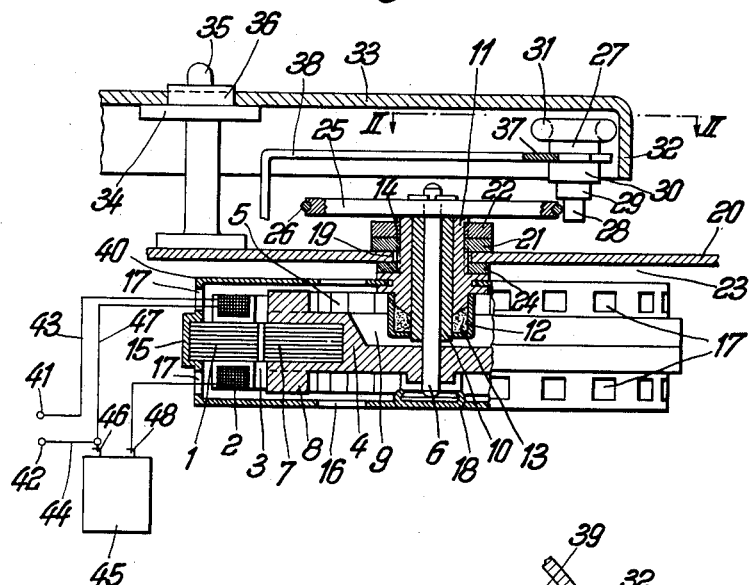
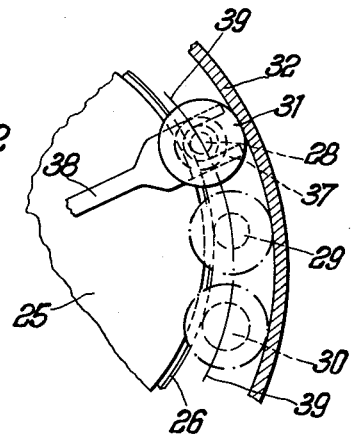

United States Patent Office 3,030,535
Patented Apr. 17, 1962

3,030,535
DRIVE MOTOR FOR APPARATUS FOR REPRODUCING SOUND RECORDS FROM SOUND CARRIERS
Ernst Wiesner, Bergstrasse 14, Dornbirn (Vorarlberg), Austria
Filed Jan. 6, 1958, Ser. No. 707,324
10 Claims. (Cl. 310—261)

Drive motors for apparatus for reproducing of sound records from sound carriers such as discs, tape, film, foil, cards or the like should meet numerous requirements, which have only partly been fulfilled so far. To avoid fluctuations in the pitch of the tone as well as rumbling it is essential, above all, that the rotational speed of the drive shaft of the motor should match as closely as possible the rotational speed of the driven surface of the turntable in the case of disc-like sound carriers or of the tape driving rollers in the case of tapes etc., so that the momentum of the rotor can be utilized as directly as possible. Besides, such motors should have a low overall height; they should be capable of being fixed in a simple manner; the shaft and the fixing means should exhibit little vibration; the shaft should be carried in a reliable, simple manner; the use of self-lubricating bearings having a large supply of lubricant or of plastic bearings should be possible; the motors should be light in weight; the flywheel should be capable of dynamic balancing by simple means; the motor should avoid a transmission of structure-borne noise; it should run true irrespective of temperature changes; it should be capable of being installed and removed with ease, show a low temperature rise, particularly at the bearings and at the shaft, and should be cooled without noise. To fulfill these requirements, e.g., in record players having speeds of 33⅓ and/or 16⅔ r.p.m., the speed of the motor must not exceed 1000 r.p.m. Whereas such electric motors are available, their manufacturing cost is in the order of the total cost of a record player so that these motors cannot be used as drive motors for record players for economic reasons.

The resulting problem to provide such a motor which fulfils all said requirements and is designed so that it can be manufactured at an economically tolerable cost is solved by a drive motor for such reproducing apparatus, which drive motor is based on the known construction in which one rotor bearing is formed as a thrust bearing and the other as a radial bearing, which protrudes beyond the inside wall of the motor housing towards the thrust bearing and receives the motor shaft, and is characterized in that it comprises a bearing sleeve and a bearing bushing, which has a portion disposed outside the motor housing and serving as a fixing socket for installing the motor preferably in a suspended arrangement, and that said sleeve and bushing protrude into a recess of the rotor so as to define clearances therewith, which recess extends from the motor shaft beyond the laminated rotor core as far as to the fan blading disposed on the outer ring of the rotor, the motor housing being formed with openings for the admission of cooling air, which openings concentrically surround the bearing bushing and are radially inwardly defined by it and the air exit openings being disposed at the periphery of the housing on both sides of the laminated stator core.

The resulting design of the motor meets all the aforesaid requirements because the fact that the bearing bushing and bearing sleeve extend into the rotor permits of providing the greatest possible bearing length, which is required for a quiet running, without any increase in overall height, which is minimized by a platelike design of the rotor, stator and housing. The same arrangement enables a simple one-hole suspension of the motor. Even more essential are the advantages which result from the fact that the motor housing, which has the form of a flat box or a plate, has next to the bearing bushings openings for admitting the cooling air sucked in by the fan blading of the rotor whereas the exit openings for the cooling air are disposed outside the rotor in the rim portion of the housing, which rim portion has preferably the shape of a cylindrical ring, which is concentric with the axis of the rotor shaft. This results in extremely favourable cooling conditions because a cooling air stream can be produced which is so strong and of such low turbulence that even in the case of very small dimensions of the motor, which need not be increased for cooling reasons, an unusually intense radial air flow is ensured. Disturbing noise will not be generated as would be the case if the admission openings for the cooling air would be arranged in the usual manner to face the fan blades. The fact that self-lubricating bearings having a large supply of lubricant or plastic bearings can be used ensures that only a small temperature rise will result at the bearings and at the shaft and will be kept in the small permissible range by the strong stream of cooling air. The shaft may simply be cast into the rotor or may be pressed into the same, desirably with an interposed liner.

FIG. 1 is a vertical sectional view showing a drive motor embodying the invention and those parts of the drive means of the record player which are connected to the motor shaft.

FIG. 2 is a horizontal sectional view taken on line II—II of FIG. 1 and shows various positions of the drive roller for the turntable of the record player.

FIG. 3 is a wiring diagram for the drive motor constructed according to the invention.

FIG. 4 is a vertical sectional view of a drive motor which is constructed according to the invention, the elastic one-hole fixation of the motor, and a fragmentary vertical sectional view of parts of the turntable drive.

The drawing shows the construction of a capacitor motor embodying the invention with reference to the example of a drive motor for the turntable of a record player.

The drawing shows the laminated stator core 1 with the coils 2, which are formed as pre-wound formers, although this is not essential within the scope of the invention. The air gap is indicated at 3. The rotor 4 with the fan blading 5 consists of an aluminium pressure diecasting, in which the shaft 6 has been cast. The rotor could also consist of copper; in this case the fan blades would consist of protruding copper bars. A different design could be provided, in which the laminated rotor core 7 is held together by a bored bushing which receives the shaft 6. The squirrel-cage winding of the rotor is indicated at 8. The bearing sleeve 10, which has the shape of a cylindrical ring and extends deeply into a recess 9 of the rotor provides an elongated unilateral radial bearing and guidance for the shaft 6. The bearing sleeve is received in the bearing bushing 11. The bearing bushing is closed at the rotor end by a cap 12, which encases the oil supply felt at 13. The bearing bushing 11 is provided at 14 with a screw thread so that it may be used for the one-hole fixation of the motor. The bearing bushing 11 serves also for fixing the preferably bipartite, disc-shaped housing. The welded seam is indicated at 15. The cooling air which has been sucked by the fan 5 can enter through the openings 16 and leaves the housing cap 40 through the opening 17. The axial thrust bearing for the shaft 6 is also arranged at one end only and consists of the disc 18, which may be inserted or impressed in the housing 40.

The bearing sleeve 10 and the bearing bushing 11 can be turned on the lathe. For this reason they enable the centering of the rotor 4 relative to the stator 1 to be provided for by the method of manufacture so that the expensive and unreliable trimming operations, which were previously necessary, are eliminated.

FIG. 1 shows also how such a motor of a record player is suspended from the upper cover plate of the chassis of the record player and how it may be used, e.g., for driving the turntable of the record plate.

To this end the bearing bushing 11 extends through an opening 19 of the top 20 of the chassis of a record player and is held in position by a lock nut 21. The suspending nut 21 is held by a lock nut 22. A spacer ring 24 is provided to enable the cooling air for the motor to be sucked through the annular gap 23.

The drive wheel 25, which carries a friction covering 26, is keyed or forced on the shaft of the motor. Depending on the axial and peripheral position of the idler roller 27 the drive wheel 26 contacts one of the steps 28, 29, 30 of this idler roller. If only one speed of the turntable of the record player is required, only one of these steps will be provided. Additional steps may be provided if the turntable is to be driven at more than three different speeds. The idler roller 27 carries also a friction covering 31, which contacts the rim 32 of the turntable 33, which is rotatably mounted at 34 and has central and annular pins 35, 36 for locating record discs having central holes of different sizes. The idler roller 27 is rotatably carried by the fork 37 of a lever 38, which can be axially lifted and lowered and can be peripherally swung in the direction of the curve 39.

When the roller 27 is, e.g., in the position shown by solid lines in FIG. 2, so that the driving friction wheel 25, 26 contacts the step 28 of the roller 27, a lower speed of the turntable 33 can be obtained by shifting the lever 38 to move the centre of the roller 27 along the curve 39. As soon as the roller has reached the intermediate position shown by dash-and-dot lines, the lever 38 is lowered to cause the step 29 to contact the friction wheel 25, 26. To obtain a still lower speed of the turntable 33, the lever 38 is shifted to move the roller 27 to the extreme position indicated by dash-and-dot lines. A further lowering of the lever 38 will cause the step 30 to contact the drive wheel 25, 26. This sequence of operations is logically reversed to obtain higher speeds for the turntable 33.

The stator winding 2 of the motor constructed according to the invention consists of a working winding and an auxiliary winding. The working winding is connected by conductors 43, 44, 47 to the mains terminals 41 and 42. The circuit of the auxiliary winding includes a capacitor having the terminals 46 and 48.

FIG. 3 shows the wiring diagram for the connection of the motor constructed according to the invention and the winding diagram. 41 and 42 are the mains terminals, to which an A.C. voltage is applied. Conductors 43, 44 lead from terminals 41, 42 to the motor terminals 50, 52 disposed on the terminal board 49. Conductors 53, 54 lead from the terminals 50, 52 to the working winding 57, which is arranged on the stator poles 56. A capacitor 48 is arranged between the conductor 44 and the motor terminal 51 on the terminal board 49. The conductor 55 leads from the terminal 51 also to stator poles 56, on which the auxiliary winding 58 is arranged, which is indicated by a dotted line in FIG. 3. Alternate stator poles are provided with the working winding 57 and the auxiliary winding 58. The auxiliary winding is connected via terminal 50 to terminal 41 and terminal 51 is connected by the capacitor 48 to the second mains terminal 42. The connection of the capacitor 48 in series with the auxiliary winding 58 causes a phase displacement between the working winding 57 and the auxiliary winding 58. This phase displacement is necessary for the production of an initial torque in motors connected to single-phase mains. Such motors are generally called "capacitor motor."

The embodiment shown in FIG. 4 comprises a motor constructed according to the invention and the appertaining turntable driving elements in an arrangement which differs from that of FIG. 1. The motor is affixed with the aid of a resilient plug 66 in a bore of the chassis plate 20. The resilient plug has a portion of reduced outside diameter. This portion is engaged by angled portions of the chassis plate so that it is sufficient to insert the bearing sleeve 68 of the motor into the plug 66 and secure it with a lock washer 67. The motor is carried in a self-lubricating sintered bearing 69, which acts like two individual bearings. This is achieved by a recess 76 formed in that part of the motor cover flange which is formed as a bearing sleeve 68. The recesses 76 may serve at the same time as a reservoir for reserve lubricant. The cone pulley 27 having the pulleys 28, 29, 30 is firmly connected for rotation with the motor shaft 6. The pulleys are engaged by the friction facing 26 of the drive wheel 25. The friction facing is also urged against the inside 32 of the turntable 33 so that rotation of the motor shaft 6 will be transmitted to the turntable. The friction wheel is rotatably carried at 59 between forked webs 60 and 61, which are connected for rotation with a shaft 63 at 62. The chassis 20 has a recess with a bearing sleeve 64 for receiving the shaft 63, which can be rotated and vertically adjusted by the actuating lever 65. The actuating lever 65 is controlled with the aid of three-dimensional cams so that the drive wheel 25 is pivotally moved around the shaft 63 and is vertically adjustable together with the shaft 63 relative to the cone pulley.

Different from the embodiment shown in FIG. 1 the motor housing of FIG. 4 is composed of two parts 70, 71. The two parts 70, 71 are held by at least two screws 72. A lug 74 struck out from the upper end plate 20 is disposed closely above the abutment portion 73 of the motor top 70. In the case of heavy vibration of the motor the amplitude of the oscillation of the motor is limited by the engagement of the lug 74 on the motor top 70. The motor shaft 6 is provided with a point bearing 75 in a recess in the casing base 71 to avoid high bearing friction and for centering.

The central admission of the cooling air enables the stream of cooling air to be discharged after it has absorbed the heat from the rotor, the laminated stator core and the windings. It has already been mentioned that the movement of the cooling air can take place without noise because the cooling air is admitted at a relatively large distance from the fan blading. On principle, the air can be guided as in large machines. A difference resides in the fact that the use of very thin-walled bearing bushings enables a direct cooling of the bearing by the cooling air so that a substantial temperature rise of the bearing and shaft will be avoided even during prolonged operation and temperature-sensitive materials may be used for the bearings and as lubricants. This results in particularly suitable sliding conditions and prolongs the life of the bearing arrangement. Because the shaft remains cold, any thermal deformation of friction wheels used in transmissions or of tapes is avoided without additional measures. The central fixation of the motor enables the rigid bearing to extend almost to the point where the load is applied to the shaft and where a yielding of the shaft or its running out of true would be undesirable. This length of the bearing can be provided without affecting the actual overall height of the motor. The central fixation prevents the bearings from being distorted and de-centred by the fixation of the motor. The centrally disposed bearing sleeve, which is connected to the stator of the motor by the relatively elastic bearing bushing, will not transmit any structure-borne noise caused by vibrations of the stator even if the sleeve is excited by magnetic or electric unbalance of the rotor. Any vibrations due to the rotary unbalance of the rotor and the plain bearing cannot cause disturbing rumbling noise even at low speeds. In conclusion, it may be pointed out that the motor speed can be adjusted within a small range by a variation of the ratio between the admission and exit cross-sections for the cooling air. The effective cooling enables the operating temperature of the motor to be kept down. The more intense the cooling is during operation, the smaller may be the temperature-sensitive parts of the motor. This results in the design of the motor housing in the form of a flat box as shown on the drawing.

What is claimed is:

1. A drive motor for apparatus for the reproduction of sound records, comprising, in combination, a rotor having a rotor shaft, a stator having a laminated stator core, a housing encasing said rotor and stator, a thrust bearing, a neck bearing, said neck bearing comprising a bearing sleeve for said rotor shaft and a bearing bushing receiving said bearing sleeve, said bearing bushing being suitable for a one-hole fixation of the motor, said neck bearing carried by the motor housing, a laminated core disposed in said rotor and a fan blading attached to the periphery of the rotor, said rotor having a central recess open toward said neck bearing, said recess being limited by a rotor surface which is substantially positioned in a plane containing the resultants of the magnetic forces occurring between the stator and the motor, said bearing bushing and bearing sleeve of the neck bearing projecting into said rotor recess up to said rotor surface so as to form clearances between the neck bearing and the rotor.

2. A drive motor as set forth in claim 1, in which said thrust bearing comprises a disk body, said disk body forming a central portion of the housing wall, and a bearing ball engaging said disk body and adapted to transmit the weight of the rotor to the disk body.

3. A drive motor as set forth in claim 1, in which said thrust bearing comprises a disk body, said disk body forming a central portion of the housing wall, and in which said central portion of the disk wall consists of a spring plate adapted to be clamped so as to be held in the rest of the housing wall.

4. A drive motor as set forth in claim 1, wherein said housing has apertures radially near said bearing bushing to admit cooling air into the space between housing and rotor, wherein said housing defines apertures at the periphery of the housing for the discharge of heated cooling air which has been conducted along the bearing bushing and has been induced by the fan blading and flown past the laminated stator core, and wherein said housing has apertures radially connected to the disk body and adapted to admit additional cooling air to the space between the housing and the rotor, said apertures at the periphery of the housing being adapted to discharge also said additional cooling air after it has flown over a limiting surface of the rotor and of the laminated stator core.

5. A drive motor as set forth in claim 1, in which said thrust bearing comprises a disk body, said disk body forming a central portion of the housing wall and a bearing ball engaging said disk body and adapted to transmit the weight of the rotor to the disk body and in which said central portion of the disk wall consists of a spring plate adapted to be clamped so as to be held in the rest of the housing wall, said rotor having the form of a flat disk, said housing being divided along a plane which extends at right angles to the rotor shaft, said cooling air discharge apertures being arranged in each of the housing halves, said housing being boxlike and adapted to the disk form of the rotor.

6. A drive motor as set forth in claim 1, in which said thrust bearing comprises a disk body, said disk body forming a central portion of the housing wall and the shaft of said rotor being pointed at one end thereof, said point being adapted to transmit the weight of the rotor to said disk body.

7. A drive motor for apparatus for the reproduction of sound records, comprising, in combination: a rotor shaft; a flat rotor carried by said shaft and formed with a central recess opening on one face of said flat rotor, said recess being limited by a rotor surface which is substantially positioned in a plane containing the resultants of the magnetic forces occurring between the stator and the motor; a stator encompassing said rotor; a housing encasing said rotor and stator; bearing means carried by said housing, encompassing said shaft and extending into said central recess up to said rotor surface of said flat rotor with clearance; and cooling means for cooling said motor, said cooling means comprising inlet means formed in said housing near that portion thereof at which said bearing means are carried by said housing for admitting cooling air into the interior of said housing, outlet means formed in said housing near the periphery thereof for allowing the discharge of heated air, and blower means carried by said rotor for moving air from said inlet openings through the interior of said housing and out of said outlet openings.

8. A drive motor for apparatus for the reproduction of sound records, comprising, in combination: a rotor shaft; a flat rotor carried by said shaft and formed with a central recess opening on one face of said flat rotor, said recess being limited by a rotor surface which is substantially positioned in a plane containing the resultants of the magnetic forces occurring between the stator and the motor; a stator encompassing said rotor; a housing encasing said rotor and stator; bearing means carried by said housing, encompassing said shaft and extending into said central recess up to said rotor surface of said flat rotor with clearance; and cooling means for cooling said motor, said cooling means comprising inlet means formed in said housing near the central portions thereof which are opposite both faces of said flat rotor to admit cooling air into the spaces between said housing and each face of said flat rotor as well as into the spaces between said housing and said stator, outlet openings formed in said housing near the periphery thereof for allowing the discharge of heated cooling air, and blower means carried by said flat rotor for moving air from said inlet openings, through said spaces and out of said outlet openings.

9. A drive motor for apparatus for the reproduction of sound records, comprising, in combination: a rotor shaft; a flat rotor carried by said shaft and formed with a central recess opening on one face of said flat rotor, said recess being limited by a rotor surface which is substantially positioned in a plane containing the resultants of the magnetic forces occurring between the stator and the motor; a stator encompassing said rotor; a housing encasing said rotor and stator; bearing means carried by said housing, encompassing said shaft and extending into said central recess up to said rotor surface of said flat rotor with clearance; and cooling means for cooling said motor, said cooling means comprising inlet means formed in said housing near that portion thereof at which said bearing means are carried by said housing for admitting cooling air into said recess along said bearing means, into the space formed between said housing and said one face of said flat rotor and into the space between said housing and said stator, outlet means formed in said housing near the periphery thereof for allowing the discharge of heated air, and blower means carried by said rotor for moving air from said inlet openings through said recess and space and out of said outlet openings.

10. A drive motor as set forth in claim 1 wherein said housing has apertures radially near said bearing bushing to admit cooling air into the space between housing and rotor, and said housing defines apertures at the periphery of the housing for the discharge of heated cooling air which has been conducted along the bearing bushing and has been induced by the fan blading and flown past the laminated stator core, wherein said thrust bearing comprises a disk body, wherein said disk forms a central portion of the housing wall, and wherein a bearing ball engages said disk body and is adapted to transmit the weight of the rotor to the disk body.

(References on following page)

References Cited in the file of this patent

UNITED STATES PATENTS

| | | |
|---|---|---|
| 1,915,090 | Hammond | June 20, 1933 |
| 2,207,251 | Guedon | July 9, 1940 |
| 2,293,508 | Killam | Aug. 18, 1942 |
| 2,753,473 | Hamm | July 3, 1956 |
| 2,829,288 | Schaefer | Apr. 1, 1958 |
| 2,847,593 | Selbach et al. | Aug. 12, 1958 |

FOREIGN PATENTS

| | | |
|---|---|---|
| 332,691 | Great Britain | July 31, 1930 |